J. HOFFMAN.
VEHICLE WHEEL.
APPLICATION FILED JULY 3, 1919.

1,385,171.

Patented July 19, 1921.
2 SHEETS—SHEET 1.

Witness
Edwin L. Bradford

Inventor
John Hoffman,
By Wm. E. Dyre
Attorney

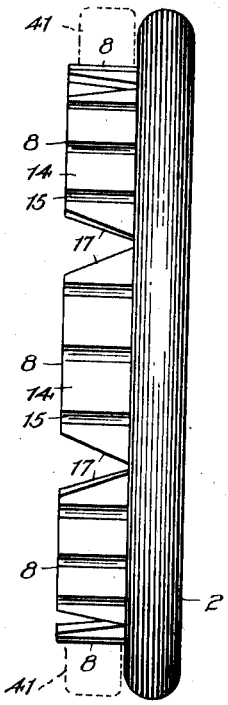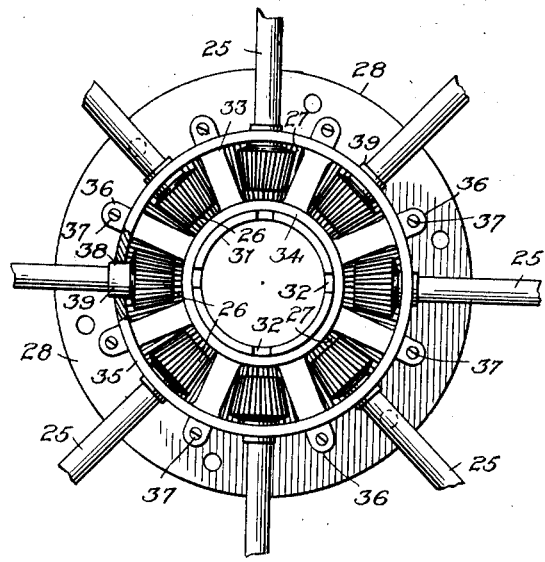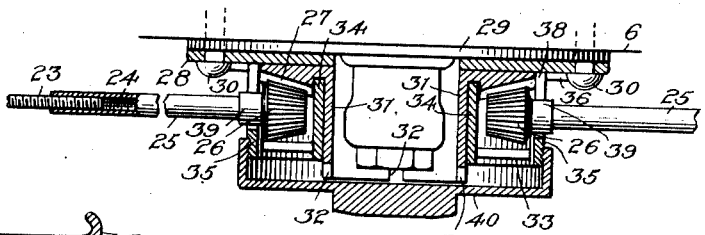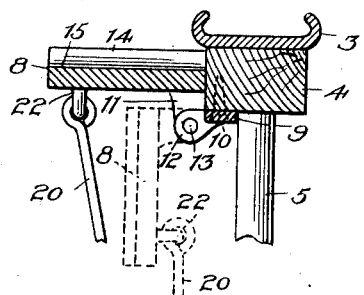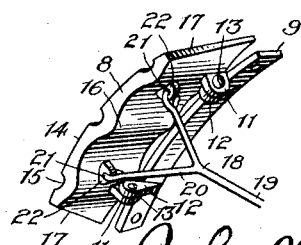

UNITED STATES PATENT OFFICE.

JOHN HOFFMAN, OF PORT HURON, MICHIGAN.

VEHICLE-WHEEL.

1,385,171.

Specification of Letters Patent.  Patented July 19, 1921.

Application filed July 3, 1919. Serial No. 308,350.

*To all whom it may concern:*

Be it known that I, JOHN HOFFMAN, a citizen of the United States, residing at Port Huron, in the county of Saint Clair and State of Michigan, have invented certain new and useful Improvements in Vehicle-Wheels; and I do hereby declare the following to be a full, clear, and exact description of the invention, such as will enable others skilled in the art to which it appertains to make and use the same.

This invention contemplates certain new and useful improvements in vehicle wheels.

An object of my invention is the production of a vehicle wheel provided with an auxiliary circumferentially disposed rim section capable of being extended laterally from one side of the wheel for purposes of increasing the supporting and traction efficiency of the wheel when used upon soft, muddy and similarly obstructed roadways.

Another object of my invention is to produce a vehicle wheel having an auxiliary tire supporting frame or rim upon which a tire can be positioned in case of puncture, thereby preventing running upon a flat tire as is sometimes the case at present.

A further object of the present invention is the production of a vehicle wheel having an auxiliary rim composed of a series of elements which can be easily extended and quickly retracted against the wheel, and means for simultaneously accomplishing the extension or retraction of the aforesaid elements as the case may be.

A still further object of the invention is to produce a vehicle wheel embodying an auxiliary rim of durable and comparatively simple construction possessing advantages of substitution and repair of the several parts, and thereby correspondingly inexpensive in its manufacture and upkeep.

With these and other objects in view the invention further consists in the combination and arrangement of the elements hereinafter described and pointed out in the appended claims.

In the drawings which show an embodiment of my invention, and in which similar reference characters designate corresponding parts:

Fig. 3 is an end elevation of my improved wheel with the auxiliary rim extended and illustrating in dotted line an auxiliary tire positioned thereon.

Fig. 4 is an enlarged view in side elevation with the cap removed showing the means for extending and retracting the auxiliary elements.

Fig. 5 is a horizontal sectional view through the rim extending and retracting means shown in Fig. 4 with the cap in position.

Fig. 6 is a detail sectional view through the rim of the wheel and the auxiliary rim in an extended position in full lines and in retracted position in dotted lines, and Fig. 7 is a detail perspective view of one of the rim elements or sectors.

Figure 1:
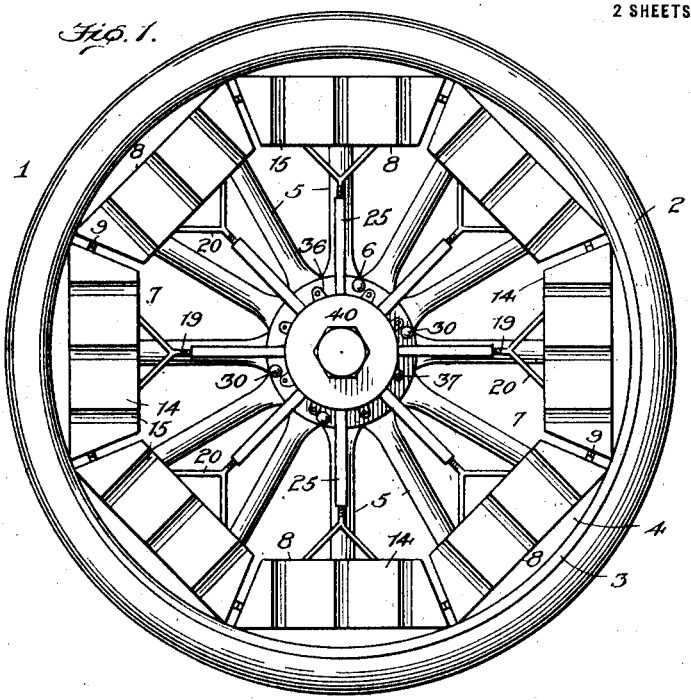
Figure 1 is a side elevation of my improved wheel illustrating the auxiliary rim in retracted position against the wheel.
Figure 2:
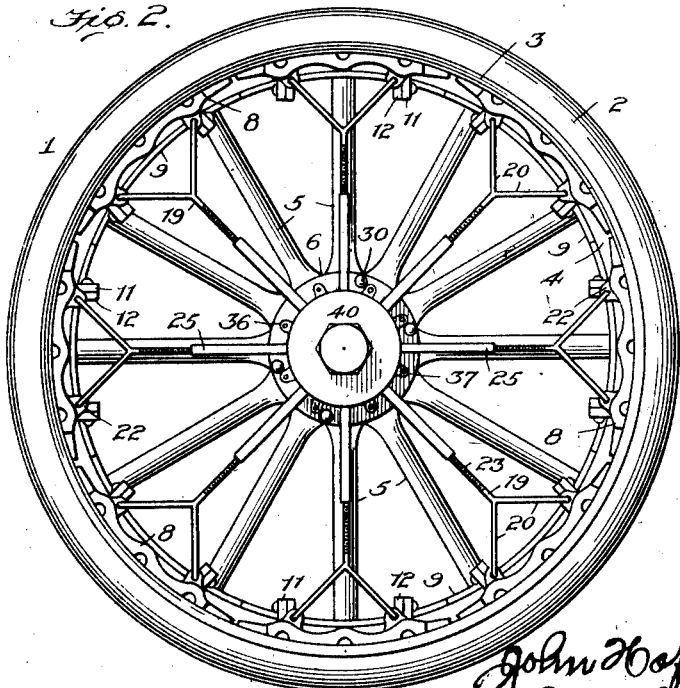
Fig. 2 is a similar view showing the auxiliary rim in extended position.

The present invention has been designed to overcome certain difficulties now incident to motor vehicle travel, such for example, as that of running into a sandy, marshy or muddy roadway. The trouble oftentimes experienced in extricating a motor vehicle from such a roadbed is well known, and various crude and laborious methods are now resorted to as a means of getting out.

The requirements necessary to a successful extrication are those of sufficient supporting and traction tread surfaces. To this end my present wheel has been designed, and comprises among other things an auxiliary rim composed of a series of circumferentially arranged members or sectors capable of being extended to form an annular supporting element having a relatively large tread surface and also capable of being retracted or collapsed substantially within the confines of the ordinary automobile wheel when not in use, and novel means including a system of gearing and screw-threaded elements for operating the said auxiliary rim sectors simultaneously.

Referring to the drawings, the wheel 1 may be of any standard construction comprising the usual pneumatic tire 2, rim 3, felly 4, spokes 5, and hub 6.

The auxiliary rim 7 comprises a series of circumferentially arranged sectors or members 8 pivotally secured to a corresponding number of base plates 9 secured to the inner surface of the felly 4 by screws or like fastenings 10, as shown in Fig. 6. The pivotal connection of the rim sectors 8 consists of projecting lugs 11 having openings therein designed to aline with similar openings formed in extending lugs 12 carried by the base plates 9, and bolts 13 adapted to be inserted within the aforesaid openings as shown.

The auxiliary rim sectors 8 are of arcuate formation and are provided upon their outer tread surfaces with relatively high and low portions 14 and 15, respectively, for purposes of obtaining greater traction. The under side of each sector 8 is wave-like or corrugated as at 16, the same being designed to insure greater strength and gripping action in conjunction with the high and low portions 14 and 15 of the outer surface. As shown in Fig. 1 the opposite ends of the rim sectors 8 are radially inclined as at 17, thereby permitting the collapsing of the said sectors substantially within the confines of the wheel 1.

The means for extending and retracting the rim sectors 8 includes among other things operating and connecting devices 18 interconnected with the said rim sectors and an operating means to be presently described. Each device 18 comprises a rod 19 having a forked or bifurcated portion 20 the ends of which are pivotally secured at 21 to eyes 22 carried upon the under surface of the sectors 8. The rod 19 is screw-threaded as at 23 and is movable within an internally threaded portion 24 of a shaft 25. Secured to each shaft 25 is a beveled pinion 26 arranged in mesh with a relatively large bevel gear 27 operably associated around the hub 6 of the wheel 1.

Referring particularly to Figs. 4 and 5, the large bevel gear 27 is rotatably positioned against a plate 28 secured to the flange 29 of the hub 6, by means of bolts or similar devices 30. A sleeve portion 31 extends from the bevel gear 27, and is provided with a series of peripherally arranged notches 32, into which a spanner or other form of wrench or tool may be inserted for purposes of rotating the said bevel gear 27.

The large bevel gear 27 is held in position upon the hub 6 by means of an annular supporting member 33 having an inner sleeve or hub section 34 into which the sleeve portion 31 of the bevel gear 27 is movably journaled, and an outer rim portion 35 having projecting lugs 36 secured by screws 37 to the plate 28.

Openings 38 are provided at intervals around the rim portion 35 and serve to accommodate a collar portion 39 of the several beveled pinions 26. These openings form bearings for the said collar portion providing however enough clearance in a lateral direction as shown in Fig. 5 for the swinging action of the connecting devices 18, as will be understood.

The annular supporting member 33 is provided with screw-threads upon the outer rim portion 35 and receives a cap 40 having a hexagonal portion as shown. This cap serves to cover the operating means and protect the same against dust and moisture.

In operation, and when it is desired to extend the auxiliary rim members, the cap 40 is removed and a spanner wrench or other tool is inserted in the notches 32 and a rotary movement imparted to the beveled gear 27 which will in turn revolve the respective beveled pinions 26, rotate the connecting devices 18 and through these threaded connections hereinbefore described extend the sectors 8 until one edge thereof abuts against the side of the felly as shown in Fig. 6, producing a rigid and effectively supported auxiliary rim. The cap 40 may now be replaced. The additional traction and supporting surfaces now produced will facilitate the action of the vehicle in extricating itself from mud or similarly yielding substances. The particular configurations of the sectors 8 serve to insure a positive grip into the soft roadbed, as will be understood.

In the case of a puncture to the pneumatic tire, the rim sectors 8 are used for supporting an auxiliary tire such as indicated by the dotted lines at 41 in Fig. 3. In this instance the showing is that of a solid rubber tire against the inner face of which is expanded the several sectors 8. The size of the solid rubber tire is sufficient to bear the weight of the vehicle without injuring the punctured pneumatic tire.

From the foregoing it will be obvious that an efficient auxiliary means has been provided for increasing the traction and supporting surfaces of an automobile wheel for emergency use, and at the same time the general appearance of the wheel maintained when running under ordinary conditions.

Various changes in the form and proportion of my invention may be resorted to without departing from the spirit of my invention, and I do not limit myself to the exact construction set forth herein.

Having thus described my invention, what I claim and desire to secure by Letters Patent is:

1. A vehicle wheel comprising an auxiliary rim formed of a series of curved members pivotally secured at one side of the wheel and adapted to form a substantially complete rim when extended, said members having their ends cut at an angle coincident with the radii of the wheel for permitting of their collapse against the side of the wheel, and means for simultaneously extending and retracting said members.

2. A vehicle wheel having a pneumatic tire thereon, an auxiliary rim formed of a series of curved members pivotally secured at one side of the wheel and adapted to abut and form a substantially complete rim when extended, said members being mounted in a plane below the tread of the wheel and arranged to receive an auxiliary tire having a tread portion projecting beyond the pneumatic tire, and means for simultaneously extending and retracting said members.

In testimony whereof I affix my signature, in presence of two subscribing witnesses.

JOHN HOFFMAN.

Witnesses:
   THOS. WELLMAN,
   HORACE G. SUMER.